United States Patent
Yoshida et al.

(10) Patent No.: US 7,351,931 B2
(45) Date of Patent: Apr. 1, 2008

(54) SWITCHING POWER SUPPLY APPARATUS AND ELECTRONIC DEVICE USING THE SAME

(75) Inventors: Koji Yoshida, Nara (JP); Mitsuhiro Matsuo, Osaka (JP); Yoshihiro Takeshima, Mie (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 143 days.

(21) Appl. No.: 10/549,927

(22) PCT Filed: Feb. 2, 2005

(86) PCT No.: PCT/JP2005/001487

§ 371 (c)(1),
(2), (4) Date: Sep. 20, 2005

(87) PCT Pub. No.: WO2005/076449

PCT Pub. Date: Aug. 18, 2005

(65) Prior Publication Data

US 2006/0181252 A1    Aug. 17, 2006

(30) Foreign Application Priority Data

Feb. 9, 2004    (JP) .............................. 2004-031766

(51) Int. Cl.
*B23K 9/095* (2006.01)
(52) U.S. Cl. ........................... 219/130.21; 219/130.33; 363/71
(58) Field of Classification Search ............ 363/17–20, 363/26, 132, 98, 25, 21.14, 92; 323/222, 323/282; 336/399, 172, 20, 55, 61

See application file for complete search history.

(56) References Cited

U.S. PATENT DOCUMENTS

| | | | | |
|---|---|---|---|---|
| 4,217,632 A | * | 8/1980 | Bardos et al. | ................. 363/17 |
| RE31,704 E | * | 10/1984 | Hester | ......................... 361/752 |
| 6,091,049 A | * | 7/2000 | Ikeda et al. | ............ 219/130.21 |
| 6,636,140 B2 | * | 10/2003 | Fujiyoshi et al. | ........... 336/200 |
| 2002/0126517 A1 | | 9/2002 | Matsukawa et al. | |

FOREIGN PATENT DOCUMENTS

| | | |
|---|---|---|
| JP | 5-135968 | 6/1993 |
| JP | 6-215951 | 8/1994 |
| JP | 2001-78449 | 3/2001 |
| JP | 2001-218468 | 8/2001 |
| JP | 2002-223565 | 8/2002 |

\* cited by examiner

*Primary Examiner*—Rajnikant B. Patel
(74) *Attorney, Agent, or Firm*—McDermott Will & Emery LLP (57) ABSTRACT

Provided is a switching power supply unit which uses a multilayer board or a stack of planar conductors as the windings of transformers so as to reduce the volume of the transformers and to have high efficiency, small size and small noise. The switching power supply unit is formed by connecting a plurality of capacitors (23), (24), (25) and (26) connected in series with each other to input terminals (22a) and (22b) of a plurality of switching power supplies having switching elements (27), (28), (29) and (30), transformers (31) and (32), and rectifiers (33), (34), (37) and (38). The switching power supply unit inputs the voltages of capacitors (23)-(26), and outputs the respective voltages developed by the plurality of switching power supplies together to common output terminals (40a) and (40b). The transformers (31) and (32) are each composed of windings made up of a stack of planar conductor coils. This structure can reduce noise transmission through the windings, thereby providing stable output characteristics.

6 Claims, 7 Drawing Sheets

SWITCHING POWER SUPPLY APPARATUS AND ELECTRONIC DEVICE USING THE SAME

This application is the U.S. National Phase under 35 U.S.C. § 371 of International Application Ser. No. PCT/JP05/001487, filed Feb. 2, 2005, which in turn claims the benefit of Japanese Application No. 2004-031766, filed Feb. 9, 2004, the disclosures of which Applications are incorporated by reference herein in their entirety.

TECHNICAL FIELD

The present invention relates to a switching power supply unit for supplying DC stabilized voltage to electronic devices for industrial and consumer use, and also relates to an electronic device using the switching power supply unit.

BACKGROUND ART

As electronic devices are getting less expensive, more compact, more sophisticated and more energy-efficient, switching power supply units are strongly expected to be smaller, highly efficient and to have stable output characteristics. In recent years, semiconductor components, particularly microprocessors, have been having lower voltage and larger current. Along with this trend, in order to secure the supply of more stable voltage and larger current, there is now a transition from the concentrated power-supply system to the distributed power-supply system in which power is supplied in the vicinity of semiconductor devices such as semiconductor components. In the distributed power-supply system, it is necessary to convert from a comparatively high bus voltage of, e.g. 48V used for supplying power to each unit of an electronic device to a highly stable low voltage of, e.g. 1V necessary for the operation of the semiconductor devices such as the semiconductor components.

A switching power supply unit allows a switching element repeatedly turning on and off to generate rectangular alternating voltage; a high-frequency transformer or the like to convert the alternating voltage; and a rectifier and a smoothing circuit to further convert the converted alternating voltage into direct current. The transformer used here is composed of a magnetic body around which a primary winding and a secondary winding are wound several times. The voltages to be applied and induced on the windings can be changed by adjusting the number of turns of the windings.

In switching power supply units, it is general that rough conversion of voltage is done by a transformer, and fine adjustments are made by PWM (Pulse Width Modulation) controlling the on-off ratio of the switching element. The primary and secondary windings used in the transformer are chosen mainly by the voltages to be applied thereon, and a higher voltage requires a larger number of turns. However, an increased number of turns of windings in the transformer increases the volume necessary for the insulation between the windings, thereby increasing the overall size of the transformer.

Figure 5:
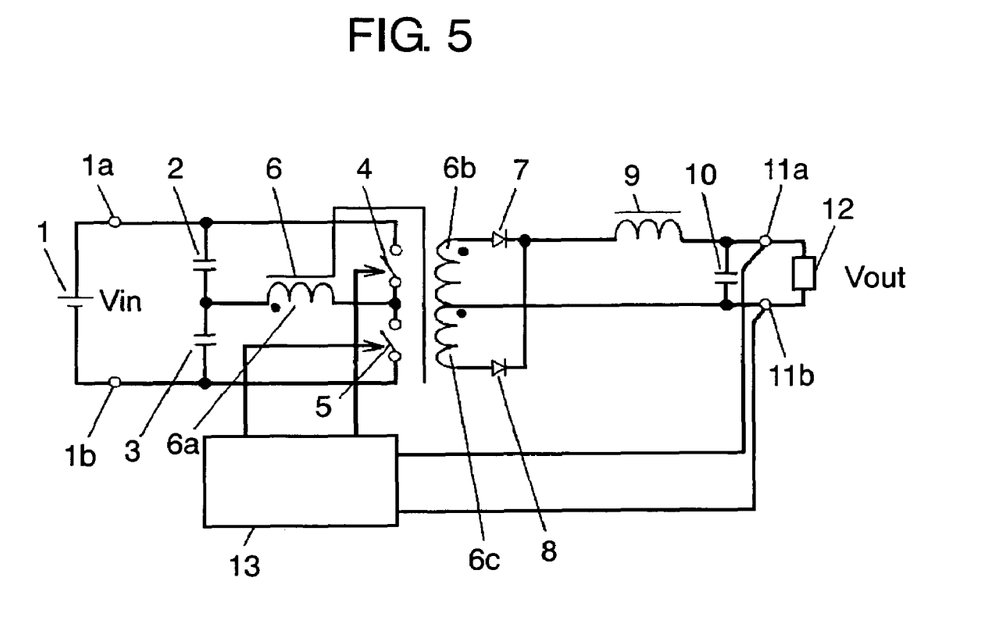
FIG. 5 is a circuit block diagram showing the structure of a conventional switching power supply unit.
Figure 6A:
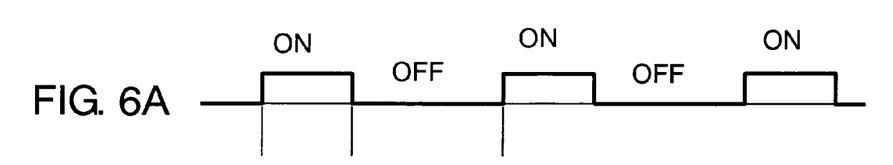
FIG. 6A is a driving waveform of a first switching element of the conventional switching power supply unit.
Figure 6B:
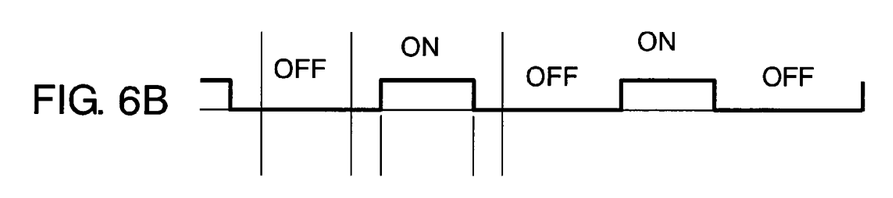
FIG. 6B is a driving waveform of a second switching element of the conventional switching power supply unit.
Figure 6C:
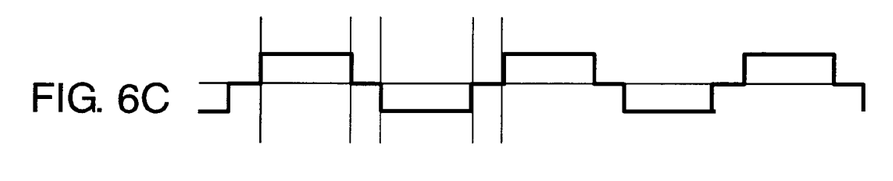
FIG. 6C is a waveform of a voltage developed in a primary winding of a transformer of the conventional switching power supply unit.
Figure 6D:
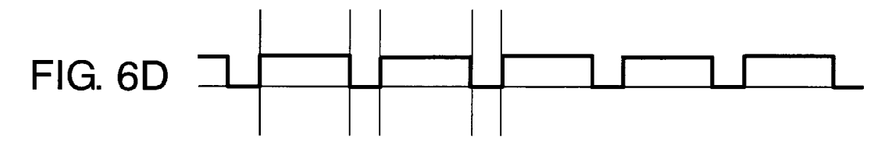
FIG. 6D is a waveform of a full-wave rectified voltage of the conventional switching power supply unit.
Figure 6E:
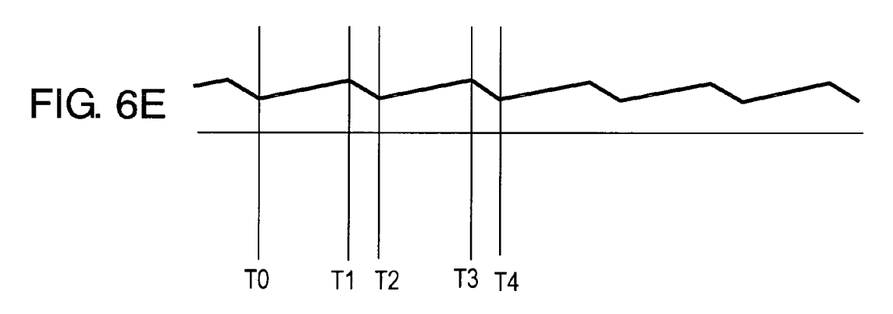
FIG. 6E is a waveform of the current flowing through an inductance of the conventional switching power supply unit.
Figure 7:
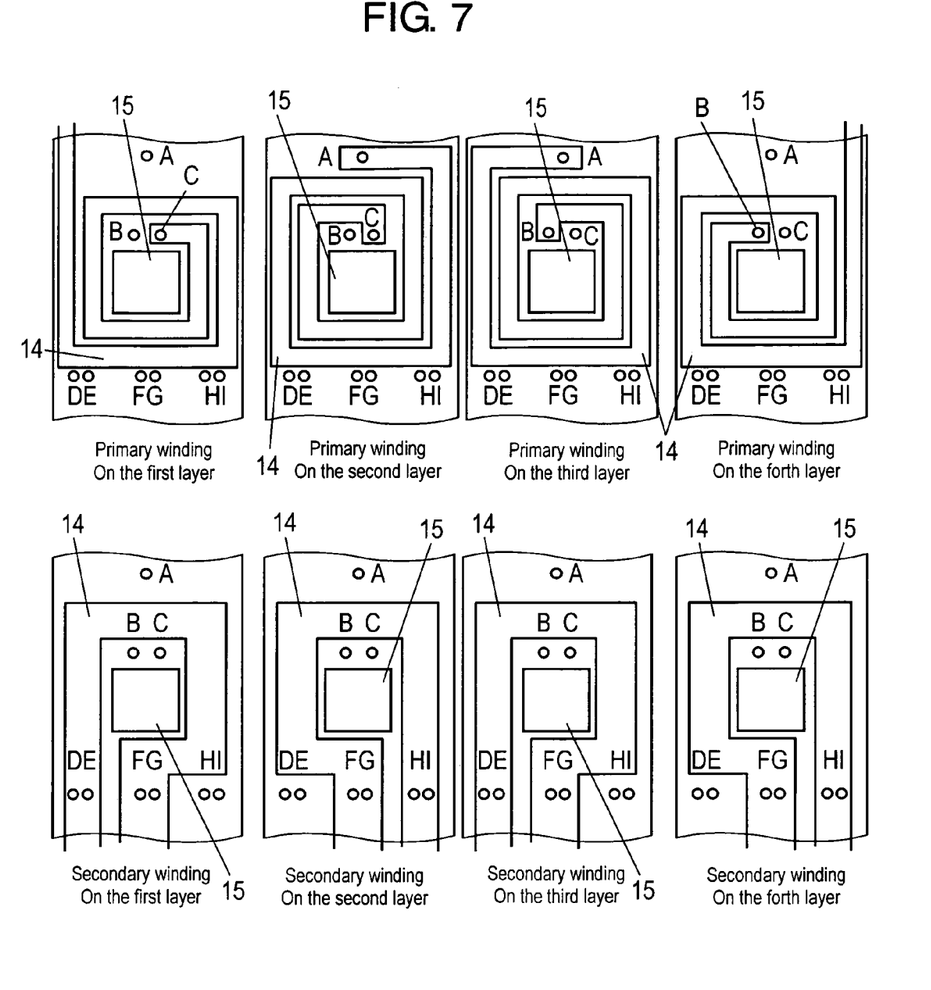
FIG. 7 is a diagram of the transformer of the conventional switching power supply unit.

One such conventional switching power supply unit which has achieved reduction in thickness and size is shown in FIGS. 5 to 7. FIG. 5 is a circuit block diagram showing the structure of a conventional switching power supply unit; FIGS. 6A to 6E are signal waveforms of main parts of the conventional switching power supply unit; FIG. 7 is a diagram of a transformer of the conventional switching power supply unit.

In the case where the switching power supply unit uses a multilayer printed board, an increase in the number of turns of windings must be achieved by either increasing the number of turns per layer or the number of layers. The following is a description about a half-bridge converter, which is a typical conventional switching power supply unit. Half-bridge converters are known as a circuit system capable of reducing the voltage to the windings of the transformer.

In FIG. 5, input voltage 1 (Vin) is placed between input terminals 1a and 1b. A capacitor series circuit of first capacitor 2 and second capacitor 3 is connected between input terminals 1a and 1b. A series circuit of first switching element 4 and second switching element 5 is connected with input terminals 1a and 1b. Transformer 6 includes primary winding 6a, first secondary winding 6b and second secondary winding 6c. One end of primary winding 6a is connected to the common connection point of first and second capacitors 2 and 3, and the other end is connected to the common connection point of first and second switching elements 4 and 5. First secondary winding 6b and second secondary winding 6c are connected in series. Second secondary winding 6c of transformer 6 and first rectifier 7 are connected in series. Second secondary winding 6c of transformer 6 and second rectifier 8 are connected in series. The cathodes of first rectifier 7 and second rectifier 8 are commonly connected to each other. First and second rectifiers 7 and 8 full-wave rectify the voltages generated in first and second secondary windings 6b and 6c of transformer 6.

Inductance element 9 and smoothing capacitor 10 are connected in series, and the other end of inductance element 9 is connected to one end of smoothing capacitor 10. The other end of smoothing capacitor 10 is connected to the common connection point of first and second secondary windings 6b and 6c of transformer 6. What is called a smoothing circuit formed of inductance element 9 and smoothing capacitor 10 smoothes full-wave rectified voltages obtained in first and second rectifier 7 and 8, and generates stable voltages at both ends of smoothing capacitor 10.

Output terminals 11a and 11b output voltages generated at both ends of smoothing capacitor 10. Load 12 is supplied with stable output voltages Vout obtained from smoothing capacitor 10. Control circuit 13 detects the voltages outputted from output terminals 11a and 11b, and in order to stabilize the output voltages, determines the on-off ratio (hereinafter, time ratio D) between first switching element 4 and second switching element 5 so as to drive these elements.

Of FIGS. 6A to 6E, FIG. 6A is a driving waveform of first switching element 4; FIG. 6B is a driving waveform of second switching element 5; FIG. 6C is a waveform of voltage developed in primary winding 6a of the transformer; FIG. 6D is a waveform of full-wave rectified voltage applied to the series circuit of inductance element 9 and smoothing capacitor 10; and FIG. 6E is a waveform of current flowing through inductance 9.

First and second switching elements 4 and 5 are turned on and off alternately at an equal time ratio of D<0.5. Turning first and second switching elements 4 and 5 on and off in an equal time ratio of D allows first and second capacitors 2 and 3 to divide the input voltage into half, that is, Vin/2 each.

Turning on first switching element 4 applies primary winding 6a of transformer 6 with voltage Vin/2 of first capacitor 2. Letting the turns ratio between the primary winding and the secondary windings be N, first and second secondary windings 6b and 6c of transformer 6 each develop voltage Vin/(2N). This causes first rectifier 7 to turn on and second rectifier 8 to turn off, thereby applying the series circuit of inductance element 9 and smoothing capacitor 10 with voltage Vin/(2N).

Similarly, turning on second switching element 5 applies primary winding 6a of the transformer with voltage Vin/2 in the opposite direction, and further applies first and second secondary windings 6b and 6c of transformer 6 with voltage Vin/(2N) in the opposite direction. This causes first rectifier 7 to turn off and second rectifier 8 to turn on, thereby applying the series circuit of inductance element 9 and smoothing capacitor 10 with voltage Vin/(2N).

When first and second switching elements 4 and 5 are both off, transformer 6 has a winding voltage of zero, thereby turning on first and second rectifiers 7 and 8. At this time, the series circuit of inductance element 9 and smoothing capacitor 10 has a voltage of zero. The current of inductance element 9 is divided into first rectifier 7 and second rectifier 8. The output voltages are determined by time ratio D of first and second switching elements 4 and 5, and the turns ratio (primary winding: secondary winding=N: 1) between primary winding 6a and the secondary windings of transformer 6 so as to make output voltages Vout=D(1/BN)Vin.

In the half-bridge converter, an input voltage is divided by first and second capacitors 2 and 3 to reduce the voltage to be applied to primary winding 6a of transformer 6, so that turns ratio N between the primary and secondary windings can be comparatively small. In order to obtain predetermined output voltages Vout, turns ratio N and time ratio D can be arbitrarily determined. However, a reduction in turns ratio N leads to an increase in the voltage to be developed in secondary windings 6b and 6c of transformer 6. As a result, a larger voltage is applied on first and second rectifiers 7 and 8 to make it necessary to prepare a device highly resistant to voltage, thereby making the on-state power loss larger.

Furthermore, in this case, the current flowing through primary winding 6a of transformer 6 increases, and time ratio D decreases; however, the loss becomes larger because of an increase in the effective value. Thus, a decrease in turns ratio N mainly increases the loss of the switching elements. In contrast, an increase in turns ratio N reduces the loss of the switching elements. However, the increased turns ratio of transformer 6 requires increasing the number of turns per layer or the number of layers when transformer 6 is made of a multilayer board provided with coils. As a result, it is inevitable that the transformer itself grows in size.

For example, when turns ratio N is set to 8 under an input voltage of 48V and an output voltage of 1V, time ratio D is 0.166. In order to set turns ratio N to 8, to make the primary winding area and the secondary winding area equal to each other, and to have one turn per layer, the multilayer board needs to have 16 layers. On the other hand, in order to form a multilayer board with 8 layers, the primary windings must have two turns per layer.

FIG. 7 shows an eight-layer board having primary windings of two turns per layer so as to make the transformer have windings at a ratio of 8:1:1. The board is provided with copper foil patterns 14 formed by etching or the like and spaces 15 corresponding to the cores to pass magnetic flux. Of throughholes A to I, throughholes having the same reference marks are on the same positions on each layer so as to connect between copper foil patterns 14 on the layers. Thus forming two turns per layer requires securing the distance between the patterns and providing interlayer connection of the multilayer board inside the coil areas. This develops a lot of spaces where no current can flow so as to reduce the usability, thereby leaving the problem of the growth of the transformer in size.

One such prior art technique is disclosed in Japanese Patent Unexamined Publication No. H06-215951.

This conventional structure has a problem in that when the windings of the transformer are made up of a multilayer board or a stack of planar conductors, a small turns ratio causes the loss of the switching elements, and increasing the turns ratio to reduce the loss increases the transformer in size.

The structure has another problem in that the use of the multilayer board or the stack of planer conductors increases the stray capacity between the coils, and the increased stray capacity allows a larger amount of noise to be transmitted by the switching voltage waveform generated by the on-off of the first and second switching elements, thereby deteriorating the stability.

SUMMARY OF THE INVENTION

An object of the present invention is to provide a switching power supply unit which, when the windings of the transformer are made up of a multilayer board or a stack of planar conductors, can have high time ratio D without increasing the turns ratio, thereby reducing the loss of the switching elements and the volume of the transformer, and can also have high efficiency, small size and low noise. Another object is to provide an electronic device using the switching power supply unit.

In order to achieve the above object, the present invention has the following structure.

The switching power supply unit of the present invention is a switching power supply unit, wherein a plurality of capacitors connected in series with each other are connected with input terminals of a plurality of switching power supplies each having a switching element, a transformer and a rectifier, so that the voltages of the plurality of capacitors are inputted to the plurality of switching power supplies and that the voltages developed in the plurality of switching power supplies are outputted together to a common output terminal, and the transformer is composed of windings made up of a stack of planar conductor coils. This structure can reduce the noise transmission through the windings, thereby providing stable output characteristics.

In the switching power supply unit of the present invention, the windings as the transformer are formed of copper foil patterns stacked on a multilayer printed board. This structure can reduce the noise transmission through the windings, thereby providing stable output characteristics.

In the switching power supply unit of the present invention, the copper foil patterns are formed one turn per layer of the multilayer printed board, and the copper foil patterns on the multilayer printed board are interconnected by a connection unit. This structure enables the efficient utilization of the regions on which to form the windings so as to miniaturize the switching power supply unit.

In the switching power supply unit of the present invention, the connection unit is formed outside the copper foil patterns. This structure enables the efficient utilization of the regions on which to form the windings so as to miniaturize the switching power supply unit.

In the switching power supply unit of the present invention, the switching power supplies are half-bridge converters. This structure can provide lower output voltage, thereby miniaturizing the transformer.

In the switching power supply unit of the present invention, the switching elements of the plurality of switching power supplies are switched on and off at regular intervals. This structure can achieve ripple cancellation, thereby providing stable output voltage.

The electronic device of the present invention is designed to supply electric power to a semiconductor device such as a semiconductor component by using the aforementioned switching power supply unit. The switching power supply unit thus miniaturized can downsize the whole electronic device and can also supply stable output voltage, so that the electronic device can have stable characteristics.

REFERENCE MARKS IN THE DRAWINGS 21 input DC voltage
22a, 22b input terminal
23 first capacitor
24 second capacitor
25 third capacitor
26 fourth capacitor
27 first switching element
28 second switching element
29 third switching element
30 fourth switching element
31 first transformer
31a primary winding of first transformer
31b first secondary winding of first transformer
31c second secondary winding of first transformer
32 second transformer
32a primary winding of second transformer
32b first secondary winding of second transformer
32c second secondary winding of second transformer
33 first rectifier diode
34 second rectifier diode
35 first choke coil
36 smoothing capacitor
37 third rectifier diode
38 fourth rectifier diode
39 second choke coil
40a, 40b output terminal
41 load
42 control circuit
43 copper foil pattern
44 core
45a primary winding on first layer of multilayer board
45b primary winding on second layer of multilayer board
45c primary winding on third layer of multilayer board
45d primary winding on fourth layer of multilayer board
46a secondary winding on first layer of multilayer board
46b secondary winding on second layer of multilayer board
46c secondary winding on third layer of multilayer board
46d secondary winding on fourth layer of multilayer board
47 first transformer
48 second transformer
49 third transformer
100 first half-bridge converter
101 second half-bridge converter
300 first half-bridge converter
301 second half-bridge converter
302 third half-bridge converter

DETAILED DESCRIPTION OF PREFERRED EMBODIMENTS

First Exemplary Embodiment

Figure 1:
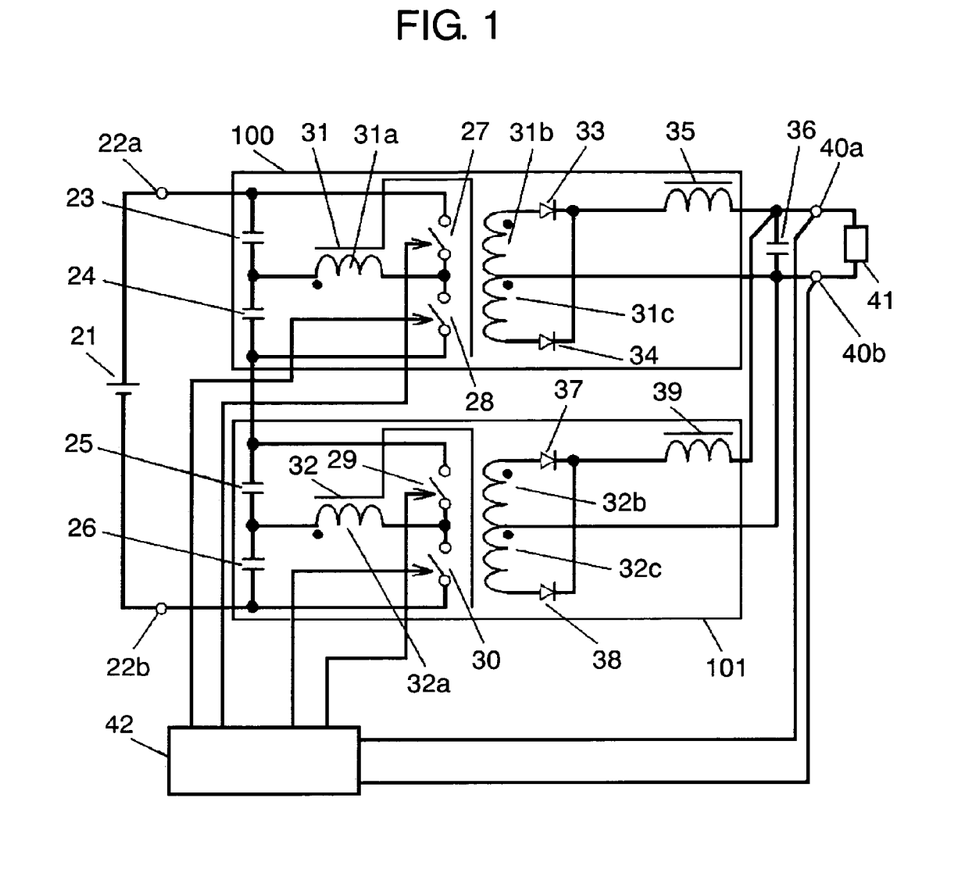
FIG. 1 is a circuit block diagram showing the structure of a switching power supply unit according to a first embodiment of the present invention.

FIG. 1 shows a circuit block diagram of a switching power supply unit according to a first embodiment of the present invention.

In FIG. 1, input DC voltage 21 is placed between input terminals 22a and 22b. First capacitor 23, second capacitor 24, third capacitor 25 and fourth capacitor 26 are connected in series between input terminals 22a and 22b. First switching element 27 and second switching element 28 are connected in series, and are connected with the series circuit of first and second capacitors 23 and 24. The series circuit of third switching element 29 and fourth switching element 30 is connected to both ends of the series circuit of third and fourth capacitors 25 and 26.

First transformer 31 includes primary winding 31a, first secondary winding 31b and second secondary winding 31c. First and second secondary windings 31b and 31c are connected in series. Second transformer 32 includes primary winding 32a, first secondary winding 32b and second secondary winding 32c. First and second secondary windings 32b and 32c are connected in series. First rectifier diode 33 and second rectifier diode 34 are commonly connected with each other at their cathodes; the anode of rectifier diode 33 is connected to one end of first secondary winding 31b of transformer 31, and the anode of rectifier diode 34 is connected to second secondary winding 31c.

The series circuit of first choke coil 35 and smoothing capacitor 36 is connected at one end thereof with the common connection point, that is, the common cathode of first and second rectifier diodes 33 and 34, and is also connected at the other end thereof with the common connection point of first and second secondary windings 31b and 31c of transformer 31, that is, secondary windings 31b and 31. In other words, the series circuit is connected to the common connection point of the other ends of secondary windings 31b and 31c.

Third rectifier diode 37 and fourth rectifier diode 38 are commonly connected with each other at their cathodes, and these rectifier diodes are connected with first and second secondary windings 32b and 32c of transformer 32. Second choke coil 39 is connected at one end with the common connection point of third and fourth rectifier diodes 37 and 38, and is connected at the other end with the common connection point of first choke coil 35 and smoothing capacitor 36.

Output terminals 40a and 40b are connected with both ends of smoothing capacitor 36. Load 41 is supplied with electric power via output terminals 40a and 40b. Control circuit 42 detects voltages outputted to output terminals 40a and 40b, determines time ratios D of first to fourth switching elements 27 to 30 in order to stabilize the output voltages, and drives the switching elements at the equal time ratio D. First and third switching elements 27 and 29 are made to have a phase difference of 90 degrees.

First half-bridge converter 100 composing part of the switching power supply is formed of first capacitor 23, second capacitor 24, first switching element 27, second switching element 28, first transformer 31, first rectifier diode 33, second rectifier diode 34, first choke coil 35 and smoothing capacitor 36.

Second half-bridge converter 101 composing part of the switching power supply is formed of third capacitor 25, fourth capacitor 26, third switching element 29, fourth switching element 30, second transformer 32, third rectifier diode 37, fourth rectifier diode 38, second choke coil 39 and smoothing capacitor 36.

The circuit operation of the switching power supply unit of the first embodiment of the present invention will be described as follows with reference to FIGS. 2A to 2I. The circuit operation is a repetition of one same cycle, so that the one cycle (from time T0 to time T8) will be described as follows. FIGS. 2A to 2I show signal waveforms of the main components of the switching power supply unit according to the first embodiment of the present invention.

Figure 2A:
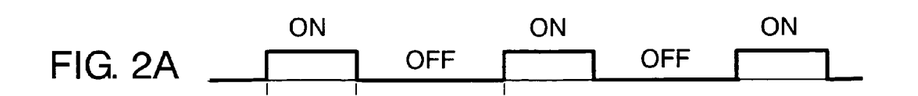
FIG. 2A is a driving waveform of a first switching element of the switching power supply unit according to the first embodiment of the present invention.
Figure 2B:
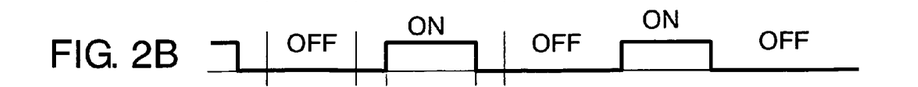
FIG. 2B is a driving waveform of a second switching element of the switching power supply unit according to the first embodiment of the present invention.
Figure 2C:
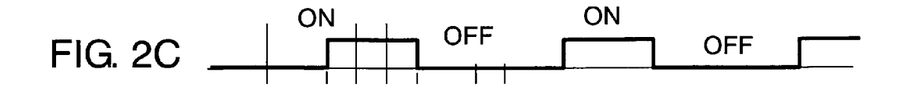
FIG. 2C is a driving waveform of a third switching element of the switching power supply unit according to the first embodiment of the present invention.
Figure 2D:
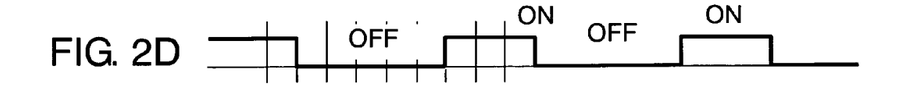
FIG. 2D is a driving waveform of a fourth switching element of the switching power supply unit according to the first embodiment of the present invention.
Figure 2E:
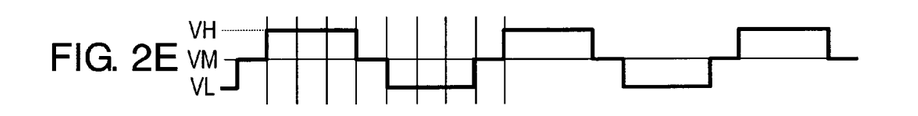
FIG. 2E is a waveform of a voltage applied to a primary winding of a first transformer according to the first embodiment of the present invention.
Figure 2F:
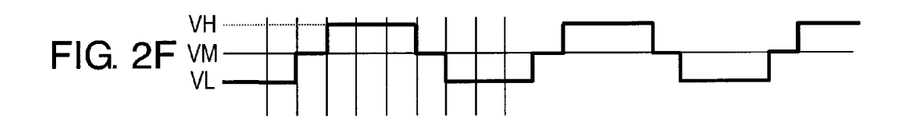
FIG. 2F is a waveform of a voltage applied to a primary winding of a second transformer according to the first embodiment of the present invention.
Figure 2G:
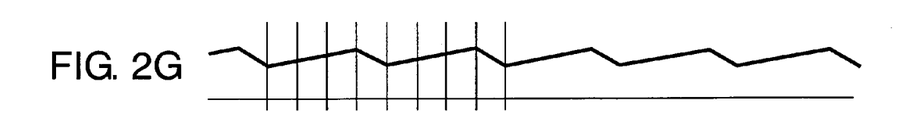
FIG. 2G is a current waveform of a first choke coil of the switching power supply unit according to the first embodiment of the present invention.
Figure 2H:
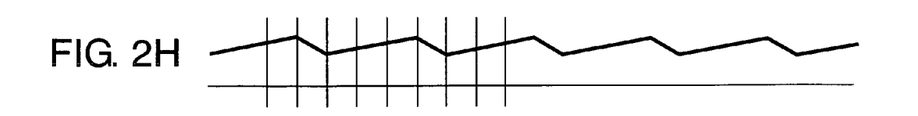
FIG. 2H is a current waveform of a second choke coil of the switching power supply unit according to the first embodiment of the present invention.
Figure 2I:
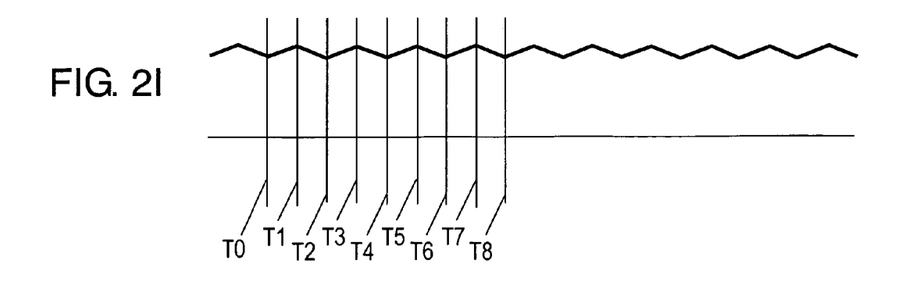
FIG. 2I is a waveform of the combined current of the first and second choke coils of the switching power supply unit according to the first embodiment of the present invention.

Of FIGS. 2A to 2D, FIGS. 2A to 2D are the respective driving waveforms of first to fourth switching elements 27 to 30; FIGS. 2E and 2F are the respective waveforms of voltages applied to primary winding 31a and 32a of first and second transformers; FIGS. 2G and 2H are the respective current waveforms of first and second choke coils 35 and 39; and FIG. 2I is a waveform of the combined current of first and second choke coils 35 and 39.

First of all, primary windings 31a and 32a of first and second transformers 31 and 32 will be described as follows. In FIGS. 2A and 2B, between times T0 and T3, first switching element 27 is in the on state and second switching element 28 is in the off state. During this period, the voltage charged at first capacitor 23 is applied to primary winding 31a of first transformer 31 so that primary winding 31a has voltage VH as shown in FIG. 2E.

Between times T3 and T4, first and second switching elements 27 and 28 are in the off state. During this period, primary winding 31a of first transformer 31 is open, so that primary winding 31a has voltage VM.

Between times T4 and T7, first switching element 27 is in the off state, and second switching element 28 is in the on state. During this period, the voltage charged at second capacitor 24 is applied to primary winding 31a of first transformer 31 in the direction opposite to the direction between times T0 and T3, so that primary winding 31a has voltage VL as shown in FIG. 2E.

Between times T7 and T8, first and second switching elements 27 and 28 are in the off state. During this period, primary winding 31a of first transformer 31 is open, so that primary winding 31a has voltage VM as shown in FIG. 2E. Hereafter, first transformer 31 repeats the same operation.

Second transformer 32 performs an operation similar to first transformer 31. More specifically, as shown in FIGS. 2C and 2D, between times T2 and T5, third switching element 29 is in the on state, and fourth switching element 30 is in the off state. During this period, the voltage charged at third capacitor 25 is applied to primary winding 32a of second transformer 32, so that primary winding 32a has voltage VH as shown in FIG. 2F. Between times T5 and T6, third and fourth switching elements 29 and 30 are in the off state. Primary winding 32a of second transformer 32 is open so as to have voltage VM.

Between times T6 and T8, and between times T0 and T1, third switching element 29 is in the off state and fourth switching element 30 is in the on state. As shown in FIG. 2F, the voltage charged at fourth capacitor 26 is applied to primary winding 32a of second transformer 32 in the direction opposite to the direction between times T2 and T5, so that primary winding 32a has voltage VL. Between times T1 and T2, third and fourth switching elements 29 and 30 are in the off state, and as shown in FIG. 2F, primary winding 32a of second transformer 32 is open so as to have voltage VM. Hereafter, second transformer 32 repeats the same operation.

The following is a description about the operations of secondary windings 31b and 31c of first transformer 31, and secondary windings 32b and 32c of second transformer 32.

First of all, the operations of secondary windings 31b and 31c of first transformer 31 between times T0 and T8 shown in FIG. 2E will be described as follows.

In FIG. 2E, between times T0 and T3, secondary winding 31b of first transformer 31 develops a voltage having a magnitude in accordance with the turns ratio of first transformer 31 so as to turn on first rectifier diode 33. Then, this voltage is applied to first choke coil 35 so that first choke coil 35 is supplied with more current as shown in FIG. 2G. From time T3 to time T4, first switching element 37 makes a transition from the on state to the off state, so that primary winding 31a of first transformer 31 is open and has a current of zero.

First and second secondary windings 31b and 31c of first transformer 31 share the current from first choke coil 35, so that first and second rectifier diodes 33 and 34 are turned on, and primary winding 31a and first and second secondary windings 31b and 31c of first transformer 31 have a voltage of zero. This makes the series circuit of first choke coil 35 and smoothing capacitor 36 have an applied voltage of 0V, thereby decreasing the current of first choke coil 35.

Between times T4 and T7 when second switching element 28 is in the on state, primary winding 31a of first transformer 31 is applied with the voltage of second capacitor 24. This voltage is applied in the direction opposite to the direction between times T0 and T3. Consequently, first and second secondary windings 31b and 31c of first transformer 31 develop voltages in the opposite direction, thereby turning off first rectifier diode 33. First choke coil 35 has a voltage having a magnitude in accordance with the turns ratio of first transformer 31 induced via second rectifier diode 34 which is in the on state, thereby increasing the current flowing through first choke coil 35 as shown in FIG. 2G. From time T7 to time T8, second switching element 28 makes a transition from the on state to the off state, so that primary winding 31a of first transformer 31 is open and has a current of zero.

First and second secondary windings 31b and 31c of first transformer 31 share the current of first choke coil 35, so that first and second rectifier diodes 33 and 34 are turned on, and all the windings of first transformer 31 have a voltage of zero. This makes the series circuit of first choke coil 35 and smoothing capacitor 36 have a voltage of 0V, thereby decreasing the current of first choke coil 35 as shown in FIG. 2G.

First and second secondary windings 32b and 32c of second transformer 32 operate in the same manner as above. More specifically, in FIG. 2F, between times T2 and T5, secondary winding 32b of second transformer 32 develops a voltage having a magnitude in accordance to the turns ratio of second transformer 32, thereby tuning on third rectifier diode 37. Then, this voltage is applied to second choke coil 39 so that second choke coil 39 is supplied with more current as shown in FIG. 2H. From time T5 to time T6, third switching element 29 makes a transition from the on state to the off state, so that primary winding 32a of second transformer 32 is open and has a current of zero.

Second secondary windings 32b and 32c of second transformer 32 share the current of second choke coil 39, so that third and second rectifier diodes 37 and 38 are turned on, and primary winding 32a and first and second secondary windings 32b and 32c of second transformer 32 have a voltage of zero. This makes the series circuit of second choke coil 39 and smoothing capacitor 36 have an applied voltage of 0V, thereby decreasing the current of second choke coil 39. Between times T6 and T8 and between T0 and T1 when fourth switching element 30 is in the on state, primary winding 32a of second transformer 32 is applied with the voltage of fourth capacitor 26.

This voltage is applied in the direction opposite to the direction between times T2 and T5. Consequently, first and second secondary windings 32b and 32c of second transformer 32 develop voltages in the opposite direction, thereby turning off third rectifier diode 37. Second choke coil 39 has a voltage having a magnitude in accordance with the turns ratio of second transformer 32 induced via fourth rectifier diode 38 which is in the on state, thereby increasing the current flowing through second choke coil 39 as shown in FIG. 2H.

From time T1 to time T2, fourth switching element 30 makes a transition from the on state to the off state, so that primary winding 32a of second transformer 32 is open and has a current of zero. First and second secondary winding 32b and 32c share the current of second choke coil 39, so that third and fourth rectifier diodes 37 and 38 are turned on, and all the windings of second transformer 32 have a voltage of zero. This makes the series circuit of second choke coil 39 and smoothing capacitor 36 have a voltage of 0V, thereby decreasing the current of second choke coil 39 as shown in FIG. 2H.

The currents shown in FIGS. 2G and 2H are commonly outputted to output terminals 40a and 40b shown in FIG. 1, so that the currents generated by first and second transformers 31 and 32 are combined to have the current waveform shown in FIG. 2I.

First and second half-bridge converters 100 and 101 operate in synchronization. Control circuit 42 is designed to control the on-off timing of first switching element 27 and the on-off timing of third switching element 29 at a phase difference of 90 degrees. Therefore, output terminals 40a and 40b output the sum of the current flowing through first choke coil 35 and the current flowing through second choke coil 39, thereby canceling and reducing ripples.

The output voltage is determined by time ratio D at which first and second switching elements 27 and 28 are turned on and off, and the turns ratio (primary windings: secondary windings=N:1) between the primary windings and the secondary windings of first transformer 31. Unlike the conventional switching power supply unit, which is formed of a single half-bridge converter, the switching power supply unit of the present invention is formed of a plurality of half-bridge converters. As a result, input voltage Vin is halved and applied to the half-bridge converters, which have an output voltage expressed by the following equation.

$$Vout=D(1/N)(Vin/2)$$

In this case, input voltage Vin of each half-bridge converter is half of input voltage Vin, and input voltage Vin of each half-bridge converter is further divided by first and second capacitors 23 and 24, so that the voltage applied to primary winding 31a of first transformer 31 is ¼ of input voltage Vin. The voltage to be applied to the transformers is reduced to half compared with the conventional case using a single half-bridge converter. As a result, in order to provide necessary output voltage Vout, turns ratio N is also half compared with the conventional case.

In order to compare with the conventional circuit structure, the specifications of the transformers in the circuit structure of the present invention will be calculated as follows. For example, letting the input voltage be 48V and the output voltage be 1V as in the calculations in the conventional circuit, time ratio D=0.166 when turns ratio N=4. In order to achieve N=4, when the primary windings and the secondary windings have the same area size, the transformers can be made up of a multilayer board having eight layers with windings of one turn per layer.

Figure 3:
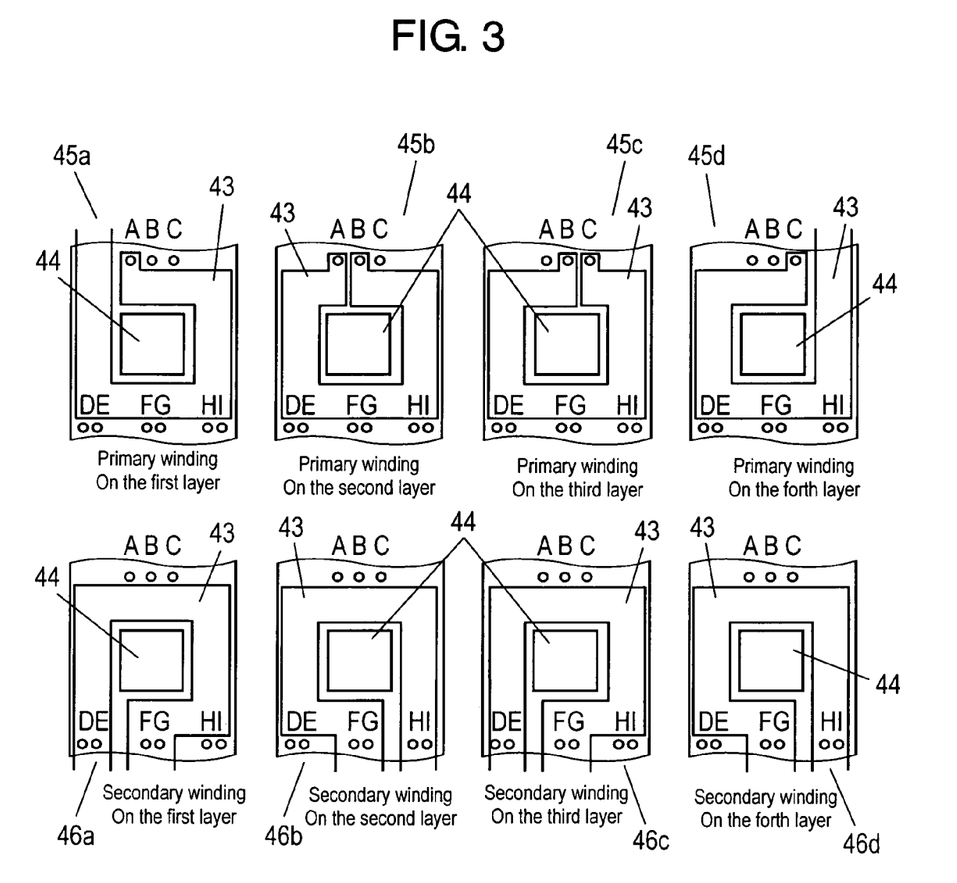
FIG. 3 is a structure of the transformers made up of a multilayer board according to the first embodiment of the present invention.

The transformers used in the switching power supply unit of the present invention will be described as follows with reference to FIG. 3. FIG. 3 shows the structure of each transformer made up of a multilayer board according to the first embodiment of the present invention. As shown in FIG. 3, a copper foil pattern is formed on each layer of an eight-layer board having primary windings of two turns per layer so as to make each transformer have windings at a ratio of 4:1:1. The board is provided with copper foil patterns 43 formed by etching or the like and spaces 44 corresponding to the cores to pass magnetic flux. FIG. 3 includes primary windings 45a to 45d, secondary windings 46a to 46d and throughholes A to I of each transformer. Of throughholes A to I, throughholes having the same reference marks are on the same positions on each layer so as to connect between copper foil patterns 43 on the layers.

The series connection of primary windings 45a to 45d can reduce turns ratio N. Each transformer has a turns ratio of 4:1 and is made up of an eight-layer board. The primary windings are formed on four layers with one turn each. Two layers of secondary windings 46a to 46d are connected in parallel to form one turn, and two layers of second secondary windings are also connected in parallel to form one turn. With this one-turn-per-layer structure, the connections between primary windings 45a to 45d and between secondary windings 46a to 46d are done outside the winding regions via throughholes A to I, thereby obviating the need for the connections inside the winding regions. This structure also obviates the need to secure insulating areas between the windings, which are necessary to have two or more turns per layer, and the need to provide throughholes for connecting the layers inside the windings of two turns. This enables the efficient utilization of the spaces in which to form the coils, thereby achieving the size reduction.

To compare the half-bridge converters of the present invention with the conventional half-bridge converter under the same conditions, two conventional half-bridge converters are prepared, and the primary sides of these conventional converters are connected in parallel. The converters of the present invention, which have the same value of current on the secondary side as the conventional converters, have the same width of copper foil patterns 43 as the conventional converters. On the other hand, the converters of the present invention have twice as much current on the primary side as the conventional converters, so that the converters of the present invention have a copper foil pattern width twice as large as the conventional converters. It has been found out that the structure of the present invention shown in FIG. 3 has a winding area about 20% less than in the conventional structure shown in FIG. 7.

The circuit structure of the present invention can reduce the amplitude of voltage to be applied on the primary side so as to reduce the noise source itself. More specifically, even with a multilayer board or a stack of planar conductors having a large stray capacity, less noise is transmitted through the windings, thereby achieving a highly stable switching power supply unit.

The first embodiment takes up a half-bridge converter as an example; however, other switching converters such as forward-type, bridge-type and push-pull-type can be used to obtain similar effects by connecting the primary sides in series and the secondary sides in parallel. In particular, when a half-bride converter is used, it is possible to reduce the number of the primary windings by connecting transformers in series and also to reduce the voltage applied to the primary windings so as to provide a lower output voltage, thereby miniaturizing the transformers.

With the aforementioned effects, in the distributed power supply system for semiconductor devices such as microprocessors, the present invention is effective as a switching power supply unit for producing a low voltage of, e.g. 1V suitable to the operation of the semiconductor devices from a comparatively high bus voltage of, e.g. 48V.

Second Exemplary Embodiment

Figure 4:
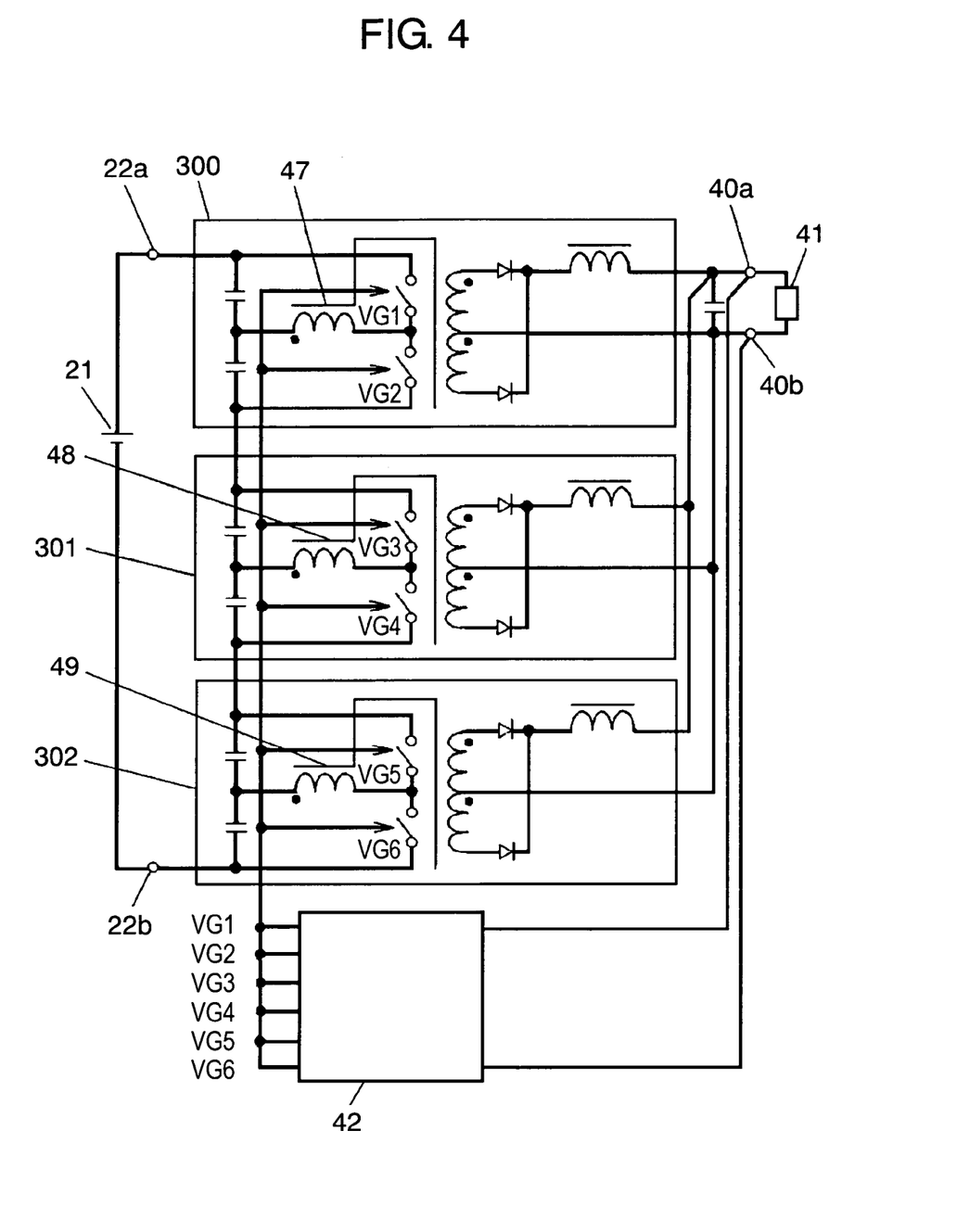
FIG. 4 is a circuit block diagram showing the structure of a switching power supply unit according to a second embodiment of the present invention.

FIG. 4 is a circuit block diagram showing the structure of a switching power supply unit of a second embodiment of the present invention. The second embodiment differs from the first embodiment shown in FIG. 1 in that three half-bridge converters instead of two are used. Each half-bridge converter basically operates in the same manner as described in the first embodiment, so that the description will not be repeated. In FIG. 4, the same components as those shown in FIG. 1 are referred to with the same reference marks.

In FIG. 4, input DC voltage 21 is placed between input terminals 22a and 22b. First half-bridge converter 300 has first transformer 47. Second half-bridge converter 301 has second transformer 48. Third half-bridge converter 302 has third transformer 49. The output currents of the three half-bridge converters are added up and smoothed to absorb ripple currents.

Output terminals 40a and 40b are commonly connected to output the outputs of half-bridge converters 300, 301 and 302 together. Load 41 is connected between output terminals 40a and 40b. Control circuit 42 detects the voltages of output terminals 40a and 40b to determine time ratio D of the switching elements of first, second and third half-bridge converters 300, 301 and 302 so as to drive them stably.

Control circuit 42 controls half-bridge converters 300 to 302 in such a manner as to shift driving signals at equal intervals, and to add up their output currents so as to cancel the output current ripples. All the switching elements are designed to have equal time ratio D.

In FIG. 4, VG1 to VG6 shown in the vicinity of transformers 47 to 49 and control circuit 42 represent driving signals to be supplied to the switching elements (having no reference marks) of transformers 47, 48 and 49. The driving signals are outputted from control circuit 42 and have the same characteristics as those shown in FIGS. 2A to 2D.

The following is a description of the operation of the switching power supply unit with the aforementioned connection. The switching power supply unit of the second embodiment differs from that of the first embodiment in that the half-bridge converters have a three-stage structure instead of two-stage. The output currents of first to third half-bridge converters 300-302 are driven in three phases and added up at output terminals 40a and 40b, so that the ripple currents cancel each other.

The three-phase driving further reduces the input voltages of half-bridge converters 300 to 302. The voltages to be applied to the switching elements are reduced to ⅓ the input voltage, and the voltages to be applied to the primary windings of the transformers become (⅙)Vin. This is ⅔ the magnitude of the first embodiment, thereby capable of responding to a low output voltage specification. For example, the first embodiment uses the eight-layer board as transformers to provide the output 1V; however, transformers having this specification can provide an output voltage of (⅔)×1V=0.667V.

Reduced output voltage generally increases the turns ratio; however, connecting a larger number of half-bridge converters in series can reduce the growth in the turns ratio, without increasing the number of layers of the board. This reduces the amplitude of the voltage to be applied to the primary windings of the transformers, thereby making the noise smaller than in the first embodiment. Furthermore, making half-bridge converters 300 to 302 shift the timing phase of the switching elements can reduce the output ripples due to multiphase effects. In addition, half-bridge converters 300 to 302 can operate in three times as wide a frequency as a single half-bridge converter, thereby capable of stabilizing the voltage with a smoothing capacitor having a smaller capacity.

Although the use of the three half-bridge converters is taken up as an example and described above, four or more half-bridge converters can be used to obtain the same effects.

Besides the half-bridge converters, other converters such as forward-type, bridge-type and push-pull-type converters can be used to obtain similar effects.

The switching unit of the present invention is effective as a switching power supply unit for producing a low voltage of, e.g. 1V suitable to the operation of semiconductor devices from a comparatively high bus voltage of, e.g. 48V in the distributed power supply system for semiconductor devices such as microprocessors and other semiconductor components.

INDUSTRIAL APPLICABILITY

The switching power supply unit of the present invention has a plurality of switching power supplies connected in parallel and each having a transformer whose windings are made up of a multilayer board or a stack of planar conductors so as to provide the transformers with high space efficiency, thereby achieving miniaturization and high efficiency. This switching power supply unit is useful to electronic devices of different types.

The invention claimed is:

1. A switching power supply unit, comprising:
   two or more switching power supplies each including:
      two capacitors connected in series;
      a transformer having a primary winding whose one end is connected to a connection point of the two capacitors;
      two switching elements connected to the other end of the two capacitors and the other ends of the primary winding of the transformer;
      a rectifier for rectifying an output of a secondary winding of the transformer; and
      a choke coil for smoothing an output of the rectifier, and
   a common control circuit for controlling the plurality of switching elements,
   wherein the two or more switching power supplies are connected to an input power supply so that the capacitors are connected in series, output voltages generated by the two or more switching power supplies are outputted to a common output terminal, the control circuit switches the plurality of switching elements in the plurality of switching power supply units at regular intervals and regular time ratios, and
   the windings of the transformer are made of stacked plate-shaped conductors.

2. The switching power supply unit according to claim 1, wherein the windings of the transformer are formed of copper foil patterns stacked on a multilayer printed board.

3. The switching power supply unit according to claim 2, wherein the copper foil patterns are formed one turn per layer of the multilayer printed board, and the copper foil patterns in the layers are interconnected by a connection unit.

4. The switching power supply unit according to claim 1, wherein each of the secondary windings of the transformer is a coil of one turn or a plurality of coils each made of one turn connected in parallel.

5. The switching power supply unit according to claim 3, wherein the connection unit is formed outside the copper foil patterns.

6. An electronic device for supplying electric power to a semiconductor device by using the switching power supply unit according to any one of claims 1 to 5.

* * * * *